No. 887,335. PATENTED MAY 12, 1908.
J. F. MEADE.
CONTINUOUS PASTEURIZING APPARATUS.
APPLICATION FILED AUG. 1, 1907.

3 SHEETS—SHEET 1.

Witnesses
M. C. Lyddane
Chas. E. Potts

Inventor
James F. Meade
By Joshua R. H. Potts
Attorney

No. 887,335. PATENTED MAY 12, 1908.
J. F. MEADE.
CONTINUOUS PASTEURIZING APPARATUS.
APPLICATION FILED AUG. 1, 1907.

3 SHEETS—SHEET 2.

Witnesses
Warren E. Willis
Eugene V. Coggey

Inventor
James F. Meade.
By Joshua R. H. Potts
Attorney

No. 887,335. PATENTED MAY 12, 1908.
J. F. MEADE.
CONTINUOUS PASTEURIZING APPARATUS.
APPLICATION FILED AUG. 1, 1907.

3 SHEETS—SHEET 3.

UNITED STATES PATENT OFFICE.

JAMES F. MEADE, OF PHILADELPHIA, PENNSYLVANIA, ASSIGNOR TO JOHN A. GERNHARDT, OF PHILADELPHIA, PENNSYLVANIA.

CONTINUOUS PASTEURIZING APPARATUS.

No. 887,335.

Specification of Letters Patent.

Patented May 12, 1908.

Application filed August 1, 1907. Serial No. 386,514.

*To all whom it may concern:*

Be it known that I, JAMES F. MEADE, a citizen of the United States, residing at Philadelphia, in the county of Philadelphia and State of Pennsylvania, have invented certain new and useful Improvements in Continuous Pasteurizing Apparatus, of which the following is a specification.

My invention relates to improvements in means for pasteurizing milk, and particularly to that class adapted to act continuously, and the object of my invention is to provide an apparatus which will readily operate upon raw milk.

Another object of my invention is to avoid the use of mechanism and removable parts whereby dust, dirt and oil may become mingled with the milk and, finally to provide an apparatus which will use the heating medium in an economical manner.

Figure 1:
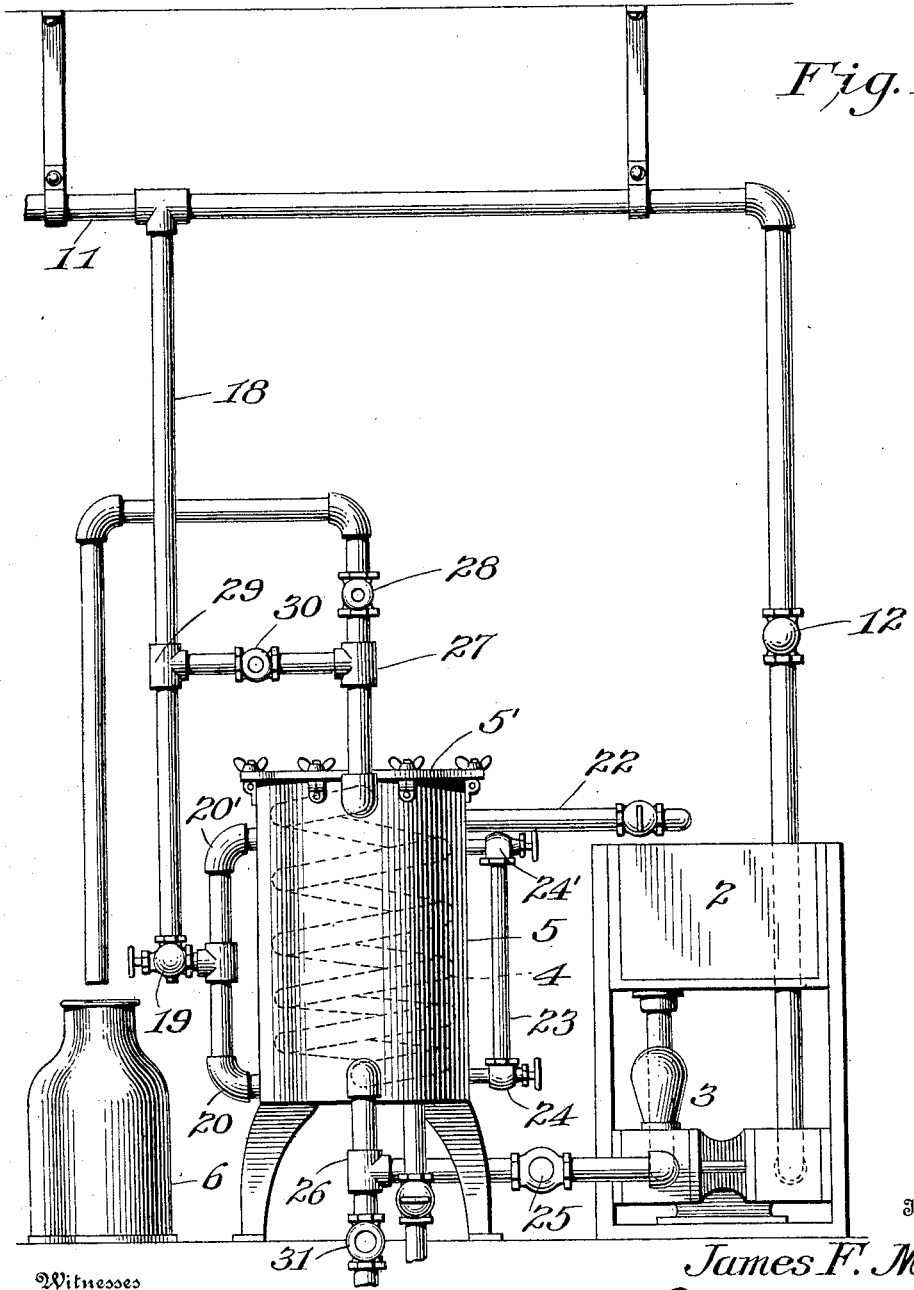
Figure 2:
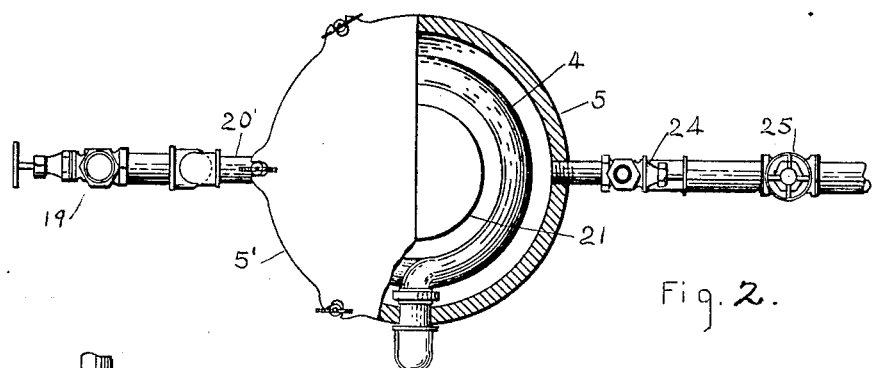
Figure 3:
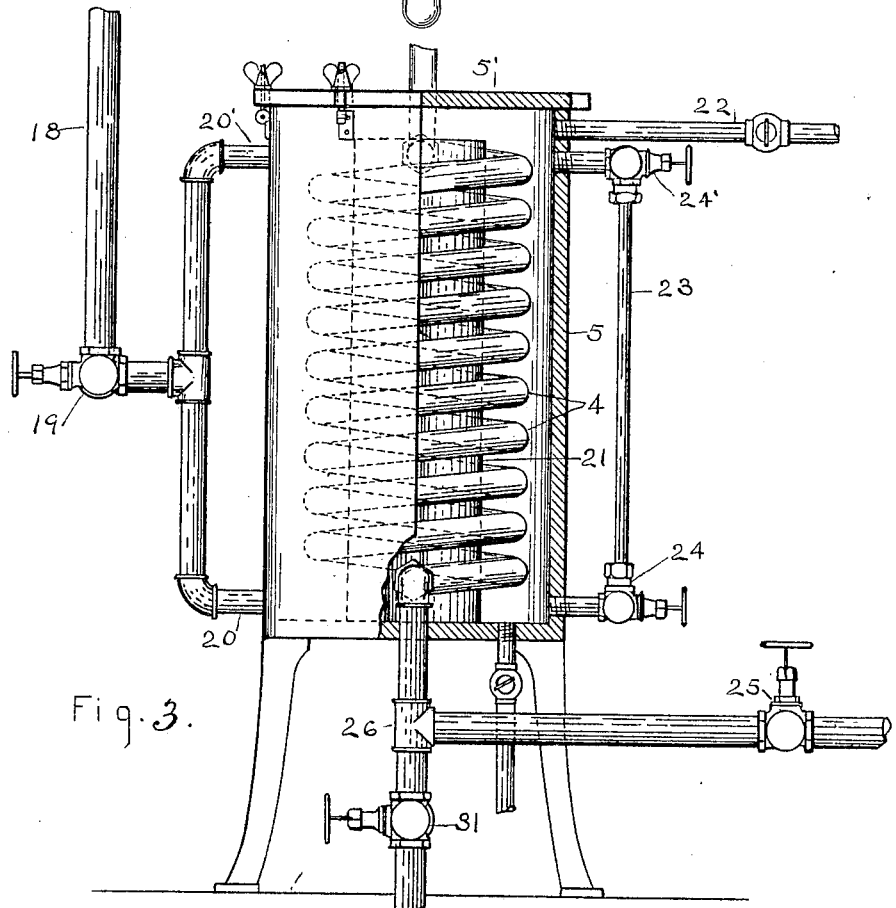
Figure 4:
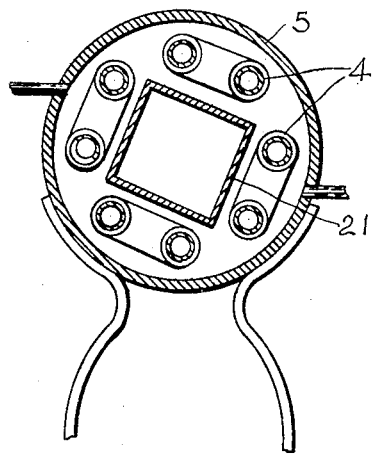
Figure 5:
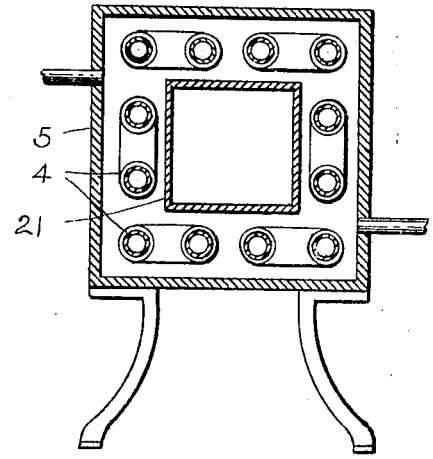

These objects are attained by the novel arrangement and construction of parts hereinafter fully described and shown in the accompanying drawings, in which;

Figure 1, is a side elevation of my improved pasteurizing apparatus. Fig. 2, is a plan view partly in section of the pasteurizer. Fig. 3, is a side view partly in section of the pasteurizer. Figs. 4 and 5, are transverse sections of modified forms of the pasteurizer.

The raw milk is delivered into the tank 2, and is delivered by gravity to the pump 3, which is preferably of a duplex or other type adapted to deliver a continuous stream. From the pump, the milk passes into the coils 4, in the pasteurizer 5, entering at the bottom and passing out at the upper part, from whence it is delivered by suitable piping to a receptacle 6.

Steam is supplied by the pipe 11, and valve 12, to the aforesaid pump 3, for forcing milk through the coils in the pasteurizer, and delivering it to the receptacle. Steam is supplied to the sterilizer 5 from the pipe 11, by the branch 18, having the elbow valve 19, connected with and providing two distinct entries, as at 20 and 20', to the interior of the pasteurizer, heating the coils 4, contained therein.

In order to provide for the rapid heating of the milk, I use an inner casing 21, within the pasteurizer 5, surrounded by the milk pipe coils in such manner that a large body or volume of steam and hot water is avoided. A suitable overflow is provided for, as at 22, and also a gage 23 to indicate the height of the water, said gage being provided with the valves 24 and 24'.

In the passage of the milk from the pump 3, to the coils 4, is interposed a valve 25 and tee 26; while in the pipes leading from the pasteurizer to the receptacle is a similar tee 27, and the valve 28, so that the milk passage through the coils can be closed by said valves 25 and 28, and when desirable the current of steam, taken from the pipe 18 through the tee 29, and valve 30 can be used in cleansing and purifying the said coils, the discharge taking place at that time through the valve 31, connecting with a suitable drain pipe.

The top of the pasteurizer 5, is provided with a suitable cover 5', attached in such manner as to be readily taken off for the purpose of cleansing the same and removing the coils which are connected to the piping by unions.

In the several forms of heater shown, particularly in Figs. 4 and 5, I use a horizontally disposed casing which may be of any preferred shape and containing longitudinally disposed pipes connected at their ends, within the casing by return bends, or double elbows as indicated. Practically the same arrangements are employed in the milk circulation and also in the heating connections as that shown in Figs. 1, 2, and 3.

In operation it is necessary only to provide a suitable supply of steam and turn the raw milk into the tank 2, whereupon the process may begin and continue uninterruptedly so long as the supplies are maintained. Obviously, it is possible to avoid the use of the milk circulating pump 3, if the milk vat 2, be elevated at a sufficient height to cause the milk to run by gravity into the pasteurizer.

The general arrangement of the apparatus is such that milk is thoroughly refined and pasteurized thereby, entirely destroying any germs of bacteria contained therein, as it comes from the cow, or from the atmosphere to which the milk may have been exposed.

The best results are found to be attained when the milk is brought to a temperature of 160 to 175 degrees Fahrenheit, in the heater or pasteurizer.

Having thus described my invention what I claim as new and desire to secure by Letters Patent is:

1. A milk pasteurizer comprising a casing having steam pipes connected thereto at two distinct points, a casing of a smaller diameter arranged in said casing, milk heating coils arranged around the inner casing and spaced therefrom, a milk supplying pipe connected to one end of said coil, and a discharge pipe connected to the other end of said coil, a pipe connecting said steam pipe to said discharge pipe, whereby steam may be forced through said coils.

2. A pasteurizing apparatus comprising a casing having an inner cylinder arranged therein, surrounded by coils of pipes, means for forcing milk through said coils, steam pipes connected to the cylinder at two distinct points, discharge pipe connected to said coil, a pipe connecting said discharge pipe to the steam pipe and valves arranged in said pipes, whereby steam can be forced through said coils.

3. A milk pasteurizer comprising a casing having a casing of a smaller diameter arranged therein, coils of pipe arranged around said inner casing and spaced therefrom, a milk supplying pipe connected to the lower end of said coil, a discharge pipe connected to the upper end of said coil, a steam supplying pipe connected to the outer casing, and a pipe connecting the discharge pipe to the steam pipe.

4. A pasteurizing apparatus comprising a casing having a casing of a smaller diameter arranged therein, coils of pipe arranged around the inner casing and spaced therefrom, an inlet pipe connected to one end of said coil, provided with a valve, a discharge pipe connected to the other end of said coil, a steam pipe connected to the outer casing at two distinct points, a valve arranged in said steam pipe, and a pipe connecting said discharge pipe to the steam pipe, whereby steam can be forced through said coil.

5. A pasteurizing apparatus comprising a casing having an inner cylinder arranged therein surrounded by a coil of pipe, an inlet pipe connected to one end of said coil provided with a tee, a discharge pipe connected to the other end of said coil a drain pipe connected to said tee provided with a valve, means for forcing milk through said coils, a steam pipe connected to the outer cylinder at two distinct points, a valve arranged in said steam pipe, a pipe connecting the discharge to the steam pipe, provided with a valve, whereby milk or steam can be forced through said coils.

In testimony whereof I have signed my name to this specification in the presence of two subscribing witnesses.

JAMES F. MEADE.

Witnesses:
WARREN E. WILLIS,
EUGENE V. COGAEY.

Correction in Letters Patent No. 887,335.

It is hereby certified that Letters Patent No. 887,335, issued May 12, 1908, upon the application of James F. Meade, of Philadelphia, Pennsylvania, for an improvement in "Continuous Pasteurizing Apparatus," were erroneously granted to "John A. Gernhardt," as assignee of the entire interest in said invention, whereas said Letters Patent shoud have been granted to the inventor, *James F. Meade and John A. Gernhardt, jointly;* said John A. Gernhardt being the assignee of one-half interest only in said patent, as shown by the record of assignments in this office; and that the said Letters Patent should be read with this correction therein that the same may conform to the record of the case in the Patent Office.

Signed and sealed this 9th day of June, A. D., 1908.

[SEAL.]
C. C. BILLINGS,
*Acting Commissioner of Patents.*